United States Patent [19]
Frei et al.

[11] Patent Number: 5,895,577
[45] Date of Patent: Apr. 20, 1999

[54] METHOD FOR CONTINUOUS DISINTEGRATION OF ACTIVATED SLUDGE

[75] Inventors: Karl Frei, Wil, Switzerland; Klaus Luger, Reichling Ludenhausen, Germany

[73] Assignee: Telsonic AG, Bronschhofen, Switzerland

[21] Appl. No.: 08/861,171

[22] Filed: May 21, 1997

[30] Foreign Application Priority Data

May 23, 1996 [CH] Switzerland ................ 1300/96

[51] Int. Cl.$^6$ ........................................... C02F 1/36
[52] U.S. Cl. ................ 210/625; 210/609; 210/626; 210/748
[58] Field of Search ........................ 210/606, 609, 210/624, 625, 626, 748

[56] References Cited

U.S. PATENT DOCUMENTS

| | | |
|---|---|---|
| 3,264,213 | 8/1966 | Pav et al. ................ 210/6 |
| 4,340,488 | 7/1982 | Toth et al. ................ 210/705 |
| 4,370,235 | 1/1983 | Suzuki et al. ................ 210/620 |
| 4,961,860 | 10/1990 | Masri ................ 210/748 |
| 5,068,036 | 11/1991 | Li et al. ................ 210/606 |
| 5,380,445 | 1/1995 | Rivard et al. ................ 210/748 |

FOREIGN PATENT DOCUMENTS 195 17 381
C1 7/1996 Germany.

*Primary Examiner*—Peter A. Hruskoci
*Attorney, Agent, or Firm*—Shoemaker and Mattare, Ltd

[57] ABSTRACT

A method is described for the continuous disintegration of microbial sludge in a sewage clarification or sewage treatment plant wherein the microbial sludge is decomposed biologically by bacteria and the resultant sludge (5) is exposed to sonic radiation in a treatment vessel (1) in order to split the cell walls of the microorganisms. With that, the sonic radiation shall be generated asymmetrically in the treatment vessel (1). The intensity of the sonic exposure lies-in an area of 500 to 1500 W/m2 and the sludge (5) is fed with a mean dwell-time of 2 to 4 minutes in counter-flow through the treatment vessel (1). The device for carrying out the method possesses a treatment vessel (1) with an eccentrically arranged sonic resonator arranged within (7).

10 Claims, 3 Drawing Sheets

METHOD FOR CONTINUOUS DISINTEGRATION OF ACTIVATED SLUDGE

The invention concerns a method and device for the continuous treatment of microbial sludge in a sewage treatment plant or a sewage clarification plant.

The state-of-the-art, continuous treatment of microbial sludge involves denitrification and biological elimination of phosphate using an added carbohydrate supplier in the form of dosage with an external substrate. This means that organic matter will be added to the sewage water which causes a greater accumulation of sludge. Treatment with anaerobic bacteria will promote gas production, which will primarily involve the methane content of the fermentation gas. As a result, removal of water from the sludge can be facilitated, and the disposal volume of the sludge reduced. In order to further reduce the amount of sludge, attempts have already been made to treat the sludge using ultrasonic energy and thereby influence the cellular structure of the organic material. In that context, U.S. Pat. 5,380,445 proposes a sonic treatment or a sonication of sludge by immersing a probe into a sludge container. Until now, this method of treatment has met with only inadequate success, however.

It is an object of the invention therefore to provide an improved method and a treatment wherein a further reduction of the residual biological solid sludge is attained.

This object is achieved by a method and by a device according to the characterizing portions of the independent patent claims.

The invention is based on the proposal that effective and successful destruction of the cell walls of the organic material in microbial sludge can be attained if the intensity and nature of the exposure to sonication is set up as follows:

(1) in flow through, the treatment vessel is fed with an microbial sewage sludges wherein the sewage sludge is fed into the treatment vessel from below and is delivered rising counter to the tendency of the sewage sludge to settle as sediment in the vessel and is withdrawn in the upper area at an overflow, and wherein, for treatment, the sewage sludge is fed upwards past a sonic source or sonicator;

(2) the ultrasonic source is arranged within the treatment vessel in such a way that the sewage sludge in principle surrounds said ultrasonic source;

(3) the energy emitted by the sonic source is reflected from the wall of the treatment vessel and/or that the microbial sludge shall be subjected to ultrasonic exposure or sonication, respectively in a plurality of cycles according to the methods of the invention.

With that, the ultrasonic output amounts to preferably 500 to 1500 Watt, and particularly 700 to 1000 Watt. It is particularly important that the sewage sludge is rising, in other words that it is introduced into the treatment vessel counter to the direction of sedimentation, in order to counteract separation of the mixture during exposure to sonication i.e. ultrasonic waves.

The rising sludge is fed past the ultrasonic source, preferably a rod-shaped sonicator. The sonication is, with that, thus limited to a specific duration. Correspondingly, according to the invention, the sewage sludge is subjected to sonic exposure in a plurality of cycles (preferably 10 to 20 cycles), instead of being continually subjected to sonication over a longer, single period of time. With that, the duration of sonic exposure per cycle is approximately 2 to 4 minutes, preferably 2 to 3 minutes. It is at the same time important that the activated sludge is fed past the sonicator at such a distance from the sonic source that cavitation will be generated within the microbial sludge.

It is also important that the wall of the sonication vessel reflects sonic energy, and accordingly that the generated energy repeatedly impinges on the microbial sludge. This can be achieved in a particularly simple way if the sonication vessel is a pipe surrounded by an elastic medium, in particular air or another gas. By means of an asymmetrical arrangement of the sonic source, mainly therefore of the rodshaped resonator, overlapping and thus mutual nullification of the reflecting waves will be avoided. The invention can be realised in a particularly effective way if the sewage sludge is continuously fed to the sonication vessel at a flow-through speed of at least 0.1 litres per second, and is then removed from said vessel.

In practice, an ultrasonic frequency within a range of 16 to 70 kHz, and in particular within a range of 20 to 25 kHz has been shown to be successful. It is particularly appropriate if the ultrasonic waves are generated in approximately right-angled "sonic packets"; in other words, that the sonic waves take effect with ultrasonic frequency at maximum output, are approximately continuously radiated for a specific time, and are then interrupted by a short pause. With that, the repetition rate of the "sonic packet" is advantageously less than 100 Hz. The sonication treatment vessel preferably possesses a feed pipe in its lower area, and an overflow in its upper area. Very good results for disintegration of the organic material in the sewage sludge can be attained if the sonication vessel is U-shaped and if the feed pipe is connected to the connecting portion between the two limbs of the U-shape. A more rapid flow-through time for the sewage sludge is obtained if a plurality of sonication vessels, with sonic resonators being arranged within said vessels, are placed adjacently in a row, the overflows of said vessels being placed above a common collector trough.

In the sequence of the method with regard to a sewage treatment plant, it is particularly advantageous if the microbial sludge being biologically treated in a sludge tank is continuously withdrawn, is subjected to treatment in a sonication device, and is returned to the biological treatment sludge tank. In the case of sludge that has been treated in this way, the solid portion can be considerably reduced in a subsequent treatment cycle.

If a secondary treatment and sedimentation tank is connected subsequent to the microbial sludge tank, it can be advantageous if sludge portions are drawn off from the secondary treatment and sedimentation tank also, or also, if necessary, only from the secondary treatment and sedimentation tank, and are disintegrated by means of a sonication device, and returned to the biological treatment tank.

In practice, it has been shown that it is particularly important and advantageous if the sludge speed, or the flow speed through the microbial treatment tank and/or the secondary treatment and sedimentation tank is set and controlled in relation to the flow volume through the sonication device in such a way that the microbial sludge is fed through the sonicator device on average 5 to 20 times, preferably 10 to 15 times, before being finally drawn off from the biological treatment sludge tank and/or the secondary treatment and sedimentation tank. Accordingly, the flow speed through the sonication device must be greater by a factor corresponding to the flow speed through the biological treatment sludge tank.

It has also been shown that, on thickening of the microbial sludge (either directly subsequent to the biological treatment sludge tank or, for example, after sedimentation in a secondary treatment and sedimentation tank), the water content in the thickened solid material can be further reduced if the sludge fed to the thickener is also treated by an sonicator device.

With regard to the figures, in each case the same references will be used for equivalent elements, and initial explanations will apply to all figures unless otherwise expressly stated.

Figure 1:
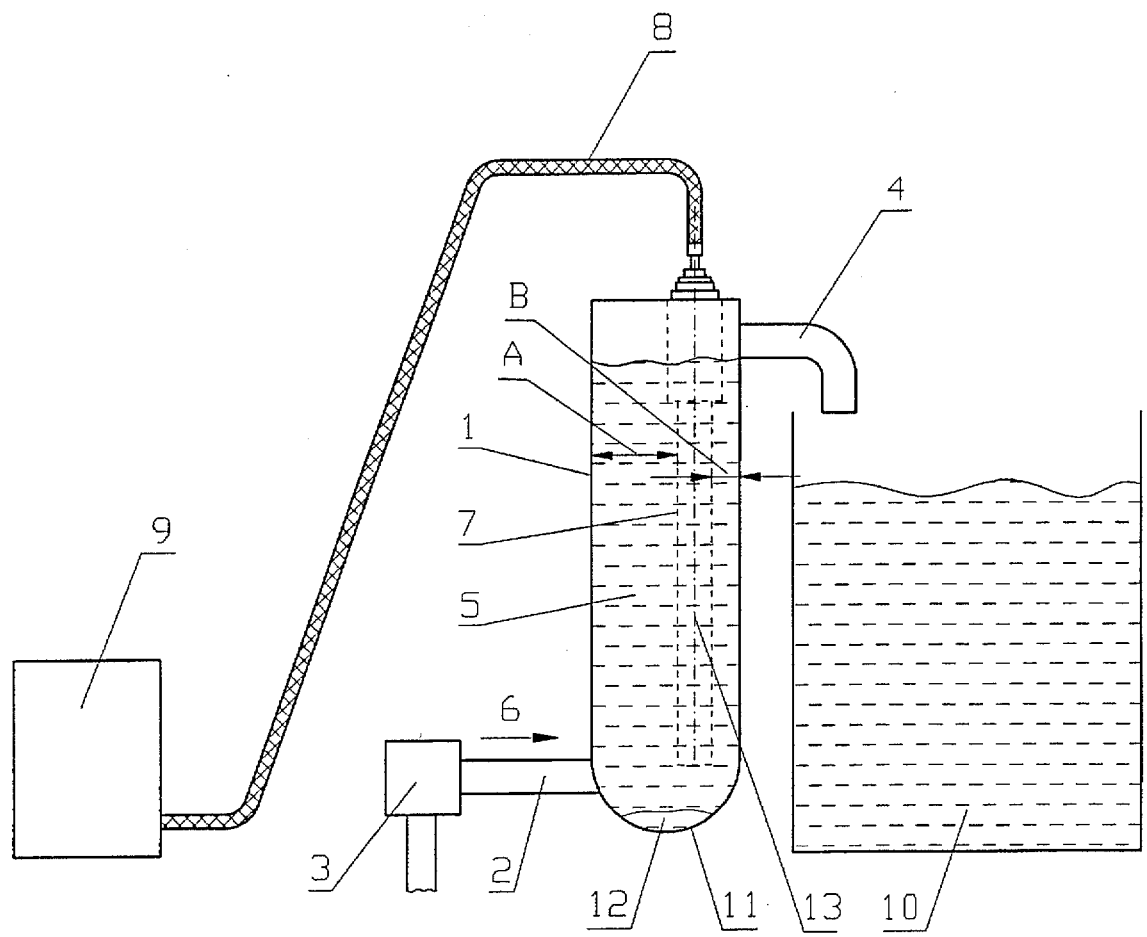
FIG. 1 A schematic representation of a treatment vessel provided with a sonicator, FIG. 2 a side view of a series of U-shaped treatment vessels with a common collector trough.

In FIG. 1, a sonic treatment vessel 1 is shown with a feed pipe 2 with a circulation pump 3 in its lower area and an overflow 4 in its upper area. Microbial sewage sludge 5 with a high liquid or water content of up to 99% is fed through the treatment vessel 1 in counter flow, in the direction shown by means of the arrow 6. With that, the direction of flow is directed against the sedimentation tendency of the microbial sludge. A rod-shaped ultrasonic resonator 7, shown with a dotted line, is provided eccentrically in the treatment vessel 1, and connected via an electrical cable 8 to a generator 9. The overflow 4 is arranged above a collector trough 10 so that the sewage sludge 5 exits from the pipe-shaped treatment vessel 1 in its upper area. Any sediment 12 can be removed from the treatment vessel 1. The average time that the sewage sludge 5 fed to the treatment vessel 1 remains within said sonication treatment vessel is between two and four minutes. To this end, the circulator pump 3 is set in such a way that the flow-through speed of the sewage sludge 5 amounts to at least 0.1 litres/second. In a preferred application, the flow-through speed amounts to approximately 0.2 to 0.3 litres/second. The volume of the treatment vessel 1 preferably amounts to 40 litres. The ratio between the largest distance A and the smallest distance B of the resonator 7 and the inner wall of the treatment vessel 1 lies in the range of 2:1 and 5:1. With that, these distances A and B are measured at right angles to the longitudinal axis 13 of the resonator 7. The radiation of the sonic waves is at right angles to the longitudinal axis 13 of the resonator 7. By means of the eccentric location of the resonator 7, mutual cancellation of the sonic waves reflected from the wall of the treatment vessel 1 and the waves radiated by the resonator 7 will be avoided. The term "eccentric arrangement" is, with that, understood to be both an arrangement that is parallel but off-centre in relation to the axis of the vessel, as well as an arrangement that is inclined in relation to the axis of the vessel. In the case of the inclined arrangement, the resonator 7 can also intersect the longitudinal axis at one point. In order that the most complete reflection possible of the sonic waves on the wall of the treatment vessel 1 can take place, the treatment vessel 1 is surrounded by a gaseous medium such as air. The sonic output lies in the range of 500 to 1200 Watt, and preferably in the range of 700 to 1000 Watt. The ultrasonic frequency lies in a region of 16 to 70 kHz. In a particularly preferred application, the sonic frequency lies between 20 and 25 kHz. The ultrasonic waves can, with that, be generated as a right-angular "sonic pakket". By means of a round cross-section of the treatment vessel 1, the distances of the individual sludge particles to the resonator are comparable.

Figure 2:
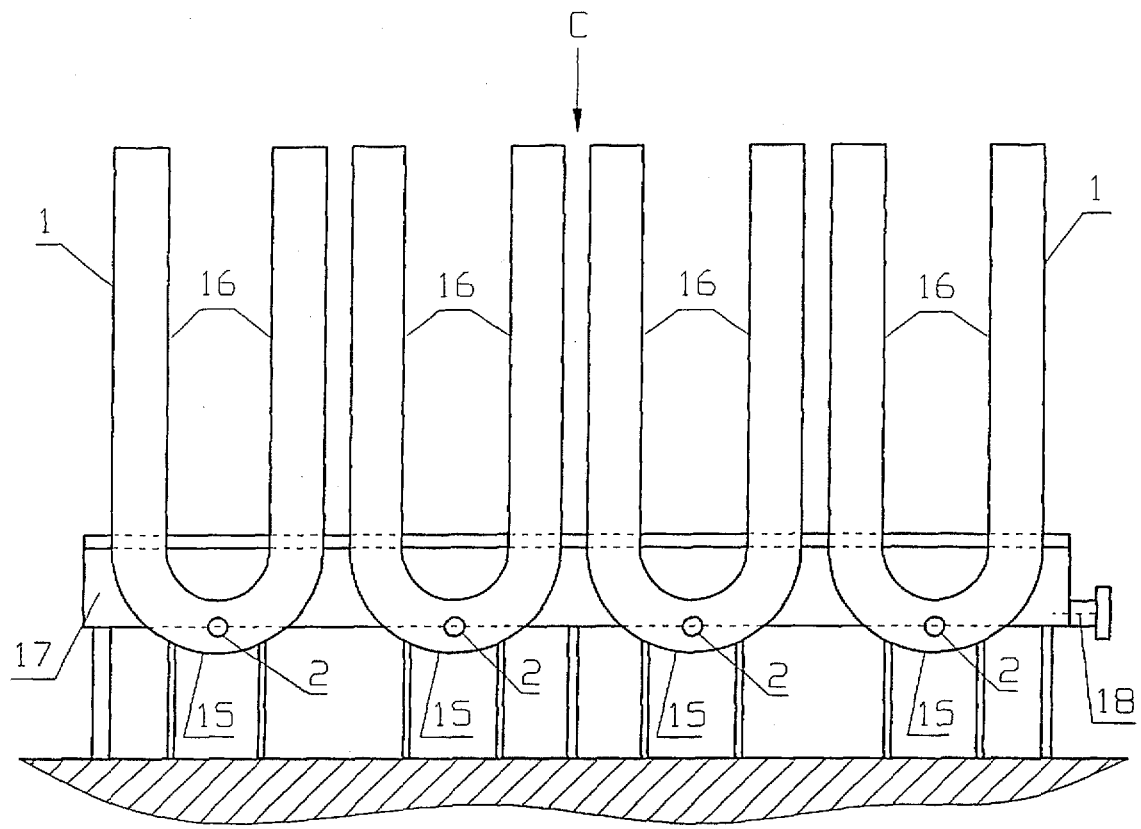
Figure 3:
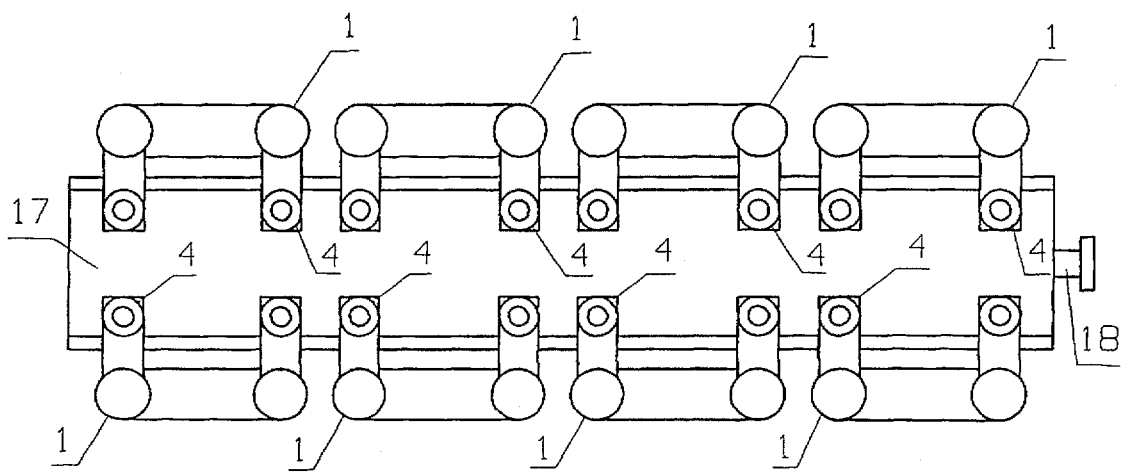
FIG. 3 a plan view in the direction of arrow C shown in the representation according to FIG. 2, and FIG. 4 a schematic representation of the sequence of sludge treatment.

In FIGS. 2 and 3, a plurality of adjacent U-shaped treatment vessels 1 are now shown arranged in a row, the feed pipes 2 of which are connected in the connecting portion 15 between the two limbs 16 of the U-shape. The overflows 4 are all arranged above a common collector trough 17, the liquid or aqueous component of the sewage sludge 5 being withdrawn from said collector trough via the connection pieces 180. This arrangement of a plurality of U-shaped treatment vessels 1 has been shown to be particularly effective for larger clarification plants because the modular design allows very simple erection.

The sequence of sewage treatment as a whole is as follows: In a preliminary sedimentation tank (not shown), the sludge particles and other undissolved contaminants in the sewage to be treated or clarified will settle to the bottom of the tank. This sediment, termed primary sewage sludge, then reaches an elutriating funnel, from where it is pumped to a thickener. This primary sewage sludge is then fed to the different sludge treatment methods. In the case of secondary treatment and sedimentation, a surplus sludge, also known as secondary sewage sludge, is withdrawn from the clarification plant with a water content of approximately 99% and a solid content of approximately 1%. With that, the solids are composed of a mass of approximately 70% organic bonded carbon and approximately 30% inorganic compounds. This distribution between organic and inorganic material deviates within a certain range from this value, however. Only a portion of the organic and inorganic compounds is dissolved in the water, while the other portion of the water is bonded by these compounds. Here, water linked in the form of cytoplasm within the cells of the microorganisms presents the greatest problem to the mechanical extraction of water from secondary sewage sludge. By means of sonic disintegration, these cells are now broken up further, so that a greater portion of water can be withdrawn from the secondary sewage sludge.

If, in the sewage treatment plant or sewage clarification plant, the entire sewage sludge is observed as a whole, a primary sewage sludge, together with deposited solids, will arise from the preliminary sedimentation phase, and a secondary sewage sludge with suspended material will result in the subsequent secondary sedimentation phase. The purpose of biological sewage clarification is to convert dissolved organic substances into a reusable biomass containing as low a water content as possible. The primary and secondary sewage sludge form the raw sludge, composed of a mixture of water, inorganic and organic material. The inorganic material comprises insolubles such as sand, clays, salts etc, as well as material that is soluble in water, such as metal-phosphate ions. The organic material comprises water-insolubles such as living and dead organic particles as well as water-solubles such as polysaccharides, proteins etc. By means of prior water extraction, the sewage sludges are partially thickened and, together with unthickened sludge, are pumped to a septic tank. As a rule, these sludges will remain in the septic tank for approximately 20 days at a temperature of approximately 37° C., and are decomposed anaerobically, i.e. without oxygen.

A considerable portion of the organic material contained in the digested sludge takes the form of microorganisms, as a component of the actual biomass. In the conventional putrefaction process, because the components within the cells are protected from enzymic hydrolysis by the cell walls and are thus inaccessible to more thorough biological decomposition, this portion cannot be further reduced.

With the method according to the invention, the yield of gas is increased by means of sonic treatment, and the residual gas and water is thus reduced to a minimum. The residual solids, resulting from the additional extraction of water through splitting of the cell walls, are deposited in the form of sediment very rapidly, by which means the volume of the deposited material can again be considerably reduced. At the same time, no additives are required in the sludge mass. By means of the mechanical extraction of water, the amount of sludge becomes less and less, so that considerable savings in operating costs and personnel effort can be achieved.

The following methods serve as examples, and can be applied in practice:

1. It is of prime importance, prior to a preliminary sedimentation, that the return-flow sludge withdrawn from a secondary sedimentation tank is disintegrated by the sonification methods described above. With that, the cells are broken up and the cell envelopes and other solid components reach an elutriating funnel while the liquid or aqueous portion from within the cells of the organic material is fed to an activation tank where the said sewage sludge is oxidised by the added aerobic bacteria. As a result, considerably less sludge will arise, which can otherwise settle in the secondary sedimentation tank and interfere with the subsequent treatment.
2. A disintegration will follow, as in the first example; however, the liquid or aqueous portion from within the cell of the organic material is used as an internal carbon supplier for the subsequent denitrification process or for biological elimination of phosphate. Apart from nitrogen and phosphorus compounds, the inside of the cell will also release hydrocarbon compounds. As a result, the external addition of carbon as required by standard methods will be dispensed with.
3. In addition to the treatments described in the examples 1 and 2, a disintegration of the surplus sludge will follow, wherein the liquid of aqueous portion from the cell interior is used for the subsequent denitrification. As an enrichment, a portion of the surplus sewage sludge is returned to the microbial sludge in the secondary sedimentation tank. The rest of the sludge is fed to the normal sludge treatment.
4. As in example 3, disintegration of the surplus sewage sludge will follow, and if necessary also of the primary sewage sludge prior to thickening. The liquid of aqueous portion from the cell interior is withdrawn and returned to the clarification process. The cell envelopes and other solid components will settle as sediment, and are fed to the sludge treatment. As a result, the solids will settle more rapidly, and the volume of the sediment will be considerably reduced. With that, the thickened mass can absorb a greater amount of solids.
5. A further disintegration of the raw sludge follows before it is thickened and fed to the septic tank. Part of the liquid or aqueous portion from the cell interior is returned to the denitrification phase, and the remainder is available for anaerobic treatment in the putrefaction phase. As a result, better decomposition of the organic mass will ensue, resulting in a higher gas yield. A greater volume of solid components can thus be accommodated in the septic tank, and as a consequence, heating can be reduced.
6. Disintegration of the sewage sludge ensues, after the putrefaction process but before said sludge is thikkened (secondary thickening). The digested sludge to be treated is additionally fed to the septic tank for further decomposition. After biological decomposition, this sewage sludge is thickened, whereupon the solids settle as sediment. The sludge thus arising is then fed to further mechanical water extraction by means of filter presses or similar.

Figure 4:
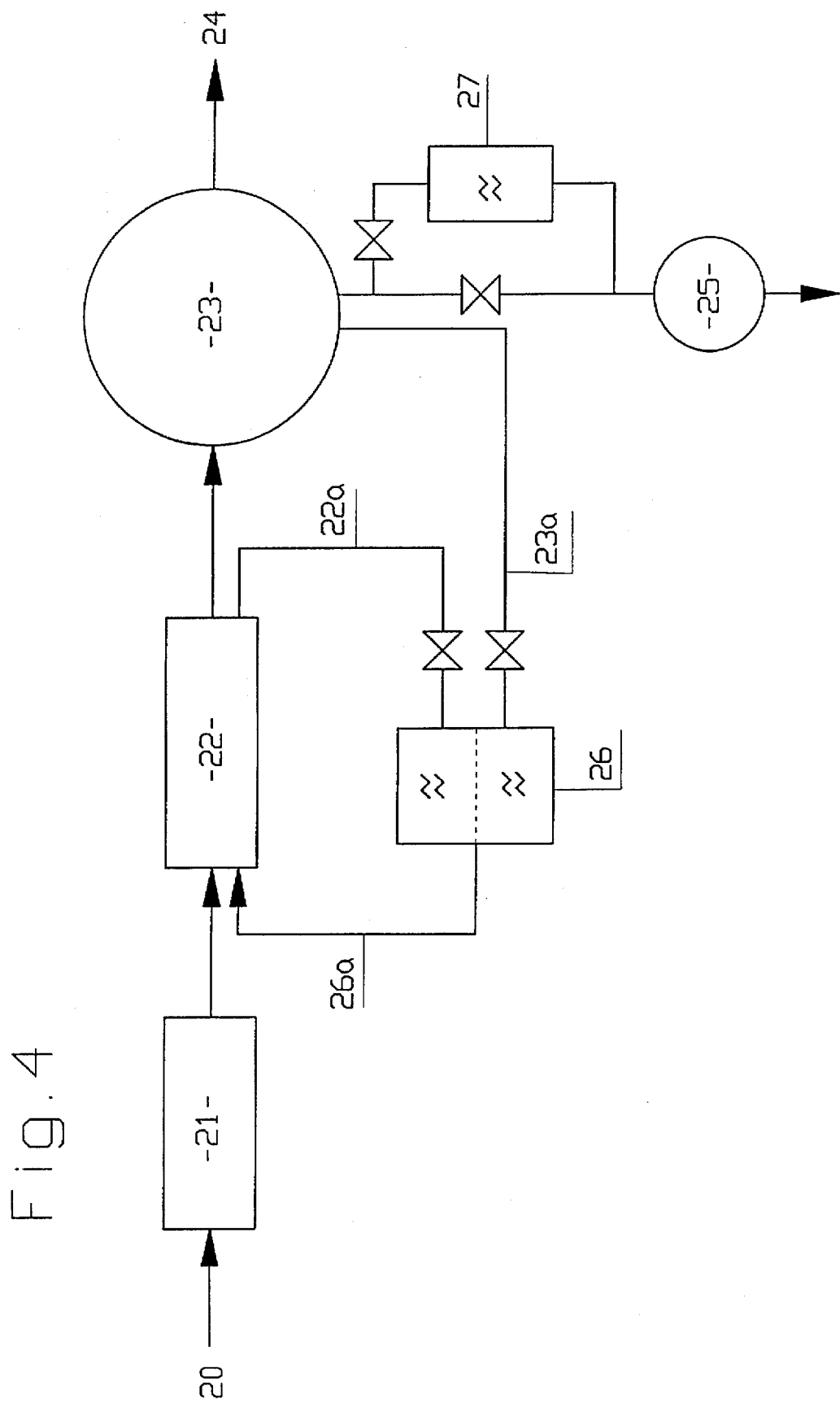

FIG. 4 shows a schematic representation of a sequence of sewage water treatment and clarification. The liquid sewage is fed from a feed 20 to a preliminary sedimentation tank 21. Rakes, sand separators and other preliminary treatment devices are not shown. From the preliminary sedimentation tank 21, the sewage water is fed to a microbial sludge tank 22, wherein the sewage treatment ensues by means of microbial sludge. When appropriate, the sludge is fed from the activated sludge tank to a secondary sedimentation tank 23. Clarified sewage water reaches a drain 24 from said secondary sedimentation tank, while thickened sewage sludge portions are fed to a thickener 25 and there subjected to further thickening. Subsequently, further processing (not shown) can ensue, (e.g. drying).

By means of the sonication device 26, with the example according to FIG. 4 the microbial sludge can be subjected to ultrasonic radiation, said microbial sludge being withdrawn through a pipe 22a from the microbial treatment sludge tank 22. Through exposure to sonication, mainly a change in structure of the sewage sludge will ensue, so that the amount of material collecting in the thickener 25 will be reduced. The microbial sludge that has been exposed to sonication is once again returned in circulation through a pipe 26a to the microbial sludge tank. Feed and withdrawal ensues by means of pumps (not shown here) according to the state of the art. With that, the flow-through speed of the microbial sludge within the microbial treatment sludge tank 22 as well as the flow-through control through the ultrasonic exposure device 26 is set in such a way that the sewage sludge treated in the sludge tank 22 is subjected to sonic exposure on average 5 to 20 times, preferably approximately 10 to 15 times, before being withdrawn from the sludge tank 22 and fed to the secondary treatment and sedimentation tank 23.

Additionally or alternatively, microbial sludge from the secondary treatment and sedimentation tank 23 can be delivered to the sonication device 26 via a pipe 23a and again fed in circulation to the sludge tank 22 via the pipe 26a. It is thus for example conceivable that sludge, not only from the sludge tank 22 but also from the secondary tank 23, is returned and exposed to sonication. In this way, the thickened sludge portion in the secondary tank 23 can be subjected to one further sonic exposure and treated in the way described by the invention. In this way, the sludge portion separated out in the secondary tank 23 can, fully intentionally, be exposed to sonication once again, which can lead to a further reduction of the solid portion occurring in the thickener 25.

As a further variation of the method, with the example according to FIG. 4, a second connectable sonication device 27 is shown between the secondary tank 23 and the thickener 25. By means of the sonication device 27, a further disintegration of the thickened sludge released from the final sedimentation tank can be intentionally carried out. This form of sewage sludge treatment between the secondary tank 23 and the thickener 25 using the second sonication device 27 causes a further reduction of the solid portion separated in the thickener 25, or of the water content of the solid material.

Naturally, the plant can be formed in such a way that only a single sonication device is provided, said device being used alternatingly or selectively for treatment of the sewage sludge withdrawn from the microbial sludge tank 22 or for treatment of the sewage sludge fed to the thickener 25. By means of appropriate piping and arrangements of valves, the circulation and treatment phases can be controlled as required.

Inasmuch as the invention is subject to modifications and variations, the foregoing description and accompanying drawings should not be regarded as limiting the invention, which is defined by the following claims and various combinations thereof:

We claim:

1. A method of continuously treating microbial sludge in a sewage treatment plant or sewage clarification plant wherein the microbial sludge is decomposed biologically by bacteria and resulting secondary sludge is exposed to ultrasound within a treatment vessel in order to destroy cell walls of cells contained in the biomass, the method comprising steps of
   (1) feeding the sludge into the treatment vessel from below so that it rises—counter to the tendency of the sludge to settle as sediment in the vessel—and withdrawing the sludge from an upper area of the vessel at an overflow, and treating the sludge as it rises by subjecting it to ultrasound from an ultrasonic source,
   (2) providing the vessel with a wall reflective of ultrasound,
   (3) arranging the ultrasonic source within the treatment vessel in such a way that
      (a) the sewage sludge substantially surrounds said ultrasonic source,
      (b) energy emitted by the ultrasonic source is reflected from the wall of the treatment vessel, and
      (c) the ultrasonic source is eccentrically located with respect to the vessel to avoid mutual nullification of sonic waves reflected from the wall and radiated from the source.

2. Method according to claim 1, wherein the secondary sludge is fed through the treatment vessel in the area of the ultrasonic source for a period of 1 to 6 minutes.

3. Method according to claim 1, wherein said period is 2 to 4 minutes.

4. Method according to claim 1, wherein the secondary sludge is continuously fed to and withdrawn from the treatment vessel.

5. Method according to claim 1, wherein the ultrasound has a frequency within the range of 16 to 70 kHz.

6. Method according to clan 5, wherein the frequency range as 20 to 25 KHz.

7. Method according to clam 5, wherein the ultrasound is generated in rectangular sonic wave packages.

8. Method according to claim 1, wherein the secondary sludge is fed to the treatment vessel in a plurality of cycles, during each of which the sludge is treated with ultrasound.

9. Method according to claim 8, wherein the number of said cycles is in the range of 8 to 15.

10. Method according to claim 9, wherein the number of said cycles is approximately 10.

* * * * *